(12) United States Patent
Kamiyama et al.

(10) Patent No.: US 6,703,437 B1
(45) Date of Patent: Mar. 9, 2004

(54) RESIN COMPOSITION FOR ELECTROSTATIC COATING

(75) Inventors: Shiro Kamiyama, Sayama (JP);
Katsumi Kohama, Sayama (JP);
Hiromichi Aoki, Takatsuki (JP);
Hajime Sakano, Bangkok (TH);
Yasunobu Takagawa, Ibaraki (JP)

(73) Assignees: Nippon A & L Inc., Osaka (JP);
Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/719,424

(22) PCT Filed: Jun. 12, 1998

(86) PCT No.: PCT/JP98/02610

§ 371 (c)(1),
(2), (4) Date: Dec. 12, 2000

(87) PCT Pub. No.: WO99/64512

PCT Pub. Date: Dec. 16, 1999

(51) Int. Cl.[7] .............................. G08K 3/30; C08L 5/04; C08L 33/00; C08L 39/00; C08L 77/12
(52) U.S. Cl. ........................ 524/421; 524/504; 524/516; 524/522; 524/538; 525/68
(58) Field of Search .................. 524/395, 418, 524/421, 504, 516, 622, 538, 910, 522; 525/66; 252/518; 427/458

(56) References Cited

U.S. PATENT DOCUMENTS

| 5,096,995 A | * | 3/1992 | Fukumoto et al. | 528/125 |
| 5,169,899 A | * | 12/1992 | Uehara et al. | 525/66 |
| 5,219,493 A | * | 6/1993 | Seshadri | 252/500 |
| 5,534,192 A | * | 7/1996 | Incorvia et al. | 252/500 |
| 5,574,101 A | * | 11/1996 | Kawakami et al. | 525/92 A |
| 5,798,403 A | * | 8/1998 | Yamashita et al. | 524/447 |
| 5,886,098 A | * | 3/1999 | Ueda et al. | 525/66 |

FOREIGN PATENT DOCUMENTS

| EP | 0 361 712 A1 | 4/1990 |
| EP | 278500 | * 8/1998 |
| JP | 4-337344 | 11/1992 |
| JP | 8-48768 | 1/1996 |
| JP | 8-81645 | 3/1996 |
| JP | 8-253640 | 10/1996 |
| JP | 9-279024 | 10/1997 |

OTHER PUBLICATIONS

English Translation of JP 04337344 (1992).*
European Search Report.
Database WPI XP002180363 (JP 06 172609 A1), Derwent Publications Ltd., Jun. 21, 1994.
International Search Report for PCT/JP98/02610–mailed Sep. 1, 1998.

* cited by examiner

Primary Examiner—Callie Shosho
(74) Attorney, Agent, or Firm—Sughrue Mion, PLLC

(57) ABSTRACT

A resin composition for electrostatic coating, comprising a rubber-reinforced aromatic vinyl resin (A), a polyamide elastomer (B), a modified vinyl polymer (C) containing at least one functional group selected from among carboxyl, epoxy, amino and amido, and an alkali metal salt (D); a formed resin article excellent in electrostatic coatability which is formed from the resin composition; and a formed resin article having electrostatic coating film which is produced by coating the articles electrostatically.

4 Claims, No Drawings

RESIN COMPOSITION FOR ELECTROSTATIC COATING

TECHNICAL FIELD

The present invention relates to a resin composition for electrostatic coating, a resin article formed from the resin composition and a formed resin article produced by coating the resin article electrostatically.

BACKGROUND ART

Rubber-reinforced styrene resin is excellent in impact resistance, moldability and the like, and utilized in various fields including vehicle parts, electrical appliances, business equipment and so on.

Among these fields, the rubber-reinforced styrene resin is chiefly applied to the vehicle parts as being coated for improving design and weatherability.

However, in the case of coating an article formed from the rubber-reinforced styrene resin, there arise problems such as insufficiency in deposition efficiency of a coating composition and difficulty in maintaining uniformity of the quality of coating surface when the article has a complicated shape.

Electrostatic coating has heretofore been performed as a coating method for solving the above problems. However, the electrostatic coating necessitates a step of subjecting an article surface to a conductive primer treatment since the rubber-reinforced styrene resin inherently is an insulating material. A method of mixing a conductive carbon with the resin has also been employed; however, the method has a drawback that impact strength of a coating film is largely decreased.

DISCLOSURE OF INVENTION

The present invention was accomplished to solve the above problems. A main object of the invention is to provide a resin composition for electrostatic coating which comprises a rubber-reinforced aromatic vinyl resin such as a rubber-reinforced styrene resin and is useful for forming an article excellent in various physical properties such as impact resistance; the article formed from the resin composition being suitably used for forming thereon a satisfactory electrostatic coating film without a conductive primer treatment.

Another object of the invention is to provide a resin article formed from the resin composition comprising a rubber-reinforced aromatic vinyl resin, the resin article being excellent in electrostatic coatability and various physical properties.

The inventors carried out an extensive research considering the conventional techniques mentioned above, and found that it is possible to form a satisfactory electrostatic coating film, even without a conductive primer treatment, on a resin article formed from a resin composition comprising a specific rubber-reinforced aromatic vinyl resin, a polyamide elastomer, a modified vinyl polymer containing a specific functional group(s), and an alkali metal salt and that the formed article is excellent in various physical properties such as impact resistance, to thereby accomplish the present invention.

Thus, the present invention provides the following resin composition, resin article formed from the resin composition, and formed resin article produced by coating the article electrostatically.

1. A resin composition for electrostatic coating comprising a rubber-reinforced aromatic vinyl resin (A), a polyamide elastomer (B), a modified vinyl polymer (C) containing at least one functional group selected from the group consisting of carboxyl, epoxy, amino and amido, and an alkali metal salt (D).

2. The resin composition according to item 1, wherein the rubber-reinforced aromatic vinyl resin (A) is a graft copolymer obtainable by polymerizing monomer components (a-2) in the presence of a rubber-like polymer (a-1), or a mixture of said graft copolymer and a copolymer of the monomer components (a-2), the monomer components (a-2) comprising (i) an aromatic vinyl monomer. (ii) at least one monomer selected from the group consisting of a vinyl cyanide monomer and an alkylester monomer of unsaturated carboxylic acid and, when necessary, (iii) another copolymerizable vinyl monomer.

3. The resin composition according to item 1, wherein the polyamide elastomer (B) is obtainable by reacting polyol with at least one compound selected from the group consisting of aminocarboxylic acid having not less than 6 carbon atoms, lactam having not less than 6 carbon atoms and nylon mn salt (m+n≧12).

4. The resin composition according to item 1, wherein the modified vinyl polymer (C) is a copolymer of an ethylenically unsaturated monomer containing at least one functional group selected from the group consisting of carboxyl, epoxy, amino and amido with another ethylenically unsaturated monomer.

5. The resin composition according to item 1, wherein the alkali metal salt (D) is at least one compound selected from the group consisting of potassium thiocyanate and an alkali metal salt of dodecylbenzenesulfonic acid.

6. The resin composition according to any one of items 1–5, comprising 2–96.95 wt. % of the rubber-reinforced aromatic vinyl resin (A), 2–96.95 wt. % of the polyamide elastomer (B), 1–50 wt. % of the modified vinyl polymer (C) and 0.05–10 wt. % of the alkali metal salt (D) when a total amount of the rubber-reinforced aromatic vinyl resin (A), the polyamide elastomer (B), the modified vinyl polymer (C) and the alkali metal salt (D) is 100 wt. %.

7. A formed resin article excellent in electrostatic coatability, which is formed from the resin composition according to any one of items 1–6.

8. A formed resin article having electrostatic coating film, which is produced by electrostatically coating the resin article according to item 7.

The resin composition for electrostatic coating of the present invention comprises a rubber-reinforced aromatic vinyl resin (A), a polyamide elastomer (B), a modified vinyl polymer (C) containing at least one functional group selected from the group consisting of carboxyl, epoxy, amino and amido, and an alkali metal salt (D).

Components comprised in the resin composition of the present invention are described below.

(A) Rubber-reinforced Aromatic Vinyl Resin

The rubber-reinforced aromatic vinyl resin is also known as a rubber-reinforced styrene resin, and is obtainable by polymerizing a rubber-like polymer (a-1) with monomer components (a-2) consisting of (i) an aromatic vinyl monomer, (ii) at least one monomer selected from the group consisting of a vinyl cyanide monomer and an alkylester monomer of unsaturated carboxylic acid and, when necessary, (iii) another copolymerizable vinyl monomer. The rubber-reinforced aromatic vinyl resin may preferably be a graft copolymer obtainable by polymerizing the monomer components (a-2) in the presence of the rubber-like polymer (a-1), or a mixture of the graft copolymer and a copolymer obtainable by polymerizing the monomer components (a-2).

Components constituting the rubber-reinforced aromatic vinyl resin are described below.

(a-1) Rubber-like Polymer

Examples of the rubber-like polymer (a-1) includes polybutadiene, a styrene-butadiene copolymer, a acrylonitrile-butadiene copolymer and like diene polymers, an ethylene-propylene copolymer, an ethylene-propylene-unconjugated diene copolymer and like ethylene-propylene copolymers, acrylic ester copolymers, chlorinated polyethylene and the like. These rubber-like polymers (a-1) are used solely or in combination of two or more.

Preparation process of the rubber-like polymer is not limited, and the rubber-like polymer may be prepared by emulsion polymerization, solution polymerization, suspension polymerization, bulk polymerization or the like according to known conditions. A gel content of the rubber-like polymer is not limited, but may preferably be 0–95%. It is particularly preferred to prepare the rubber-like polymer by the emulsion polymerization from the viewpoint of controllability of the gel content.

(a-2) Monomer Components

The monomer components (a-2) comprise (i) an aromatic vinyl monomer, (ii) at least one monomer selected from the group consisting of a vinyl cyanide monomer and an alkylester monomer of unsaturated carboxylic acid and, when necessary, (iii) another copolymerizable vinyl monomer.

Examples of the aromatic vinyl monomer (i) includes styrene, α-methylstyrene, o-methylstyrene, m-methylstyrene, p-methylstyrene, t-butylstyrene, α-methylvinyltoluene, dimethylstyrene, chlorostyrene, dichlorostyrene, bromostyrene, dibromostyrene, vinylnaphthalene and the like; among which styrene is particularly preferred. The aromatic vinyl monomer may be used solely or in combination of two or more.

The vinyl cyanide monomer and the alkylester monomer of unsaturated carboxylic acid (monomer (ii)) are used solely or in combination.

Examples of the vinyl cyanide monomer include acrylonitrile, methacrylonitrile, fumaronitrile and the like; among which acrylonitrile is particularly preferred.

Examples of the alkylester monomer of unsaturated carboxylic acid include methyl (meth)acrylate, ethyl (meth)acrylate, propyl (meth)acrylate, 2-ethylhexyl (meth)acrylate and the like; among which methyl methacrylate is particularly preferred.

These monomers may be used solely or in combination of two or more.

In the present invention, it is particularly preferred to use the cyanide vinyl monomer as the monomer (ii).

As another copolymerizable vinyl monomer (iii), a monomer copolymerizable with (i) the aromatic vinyl monomer and (ii) at least one monomer selected from the group consisting of the vinyl cyanide monomer and the alkylester monomer of unsaturated carboxylic acid may suitably be used, and, preferably, said another copolymerizable vinyl monomer (iii) is also copolymerizable with the rubber-like polymer.

Specific examples of said another copolymerizable vinyl monomer include acrylic acid, methacryllc acid, maleic acid and like unsaturated carboxylic acids; maleic anhydride, citraconic anhydride and like anhydrides of unsaturated dicarboxylic acid; maleimide, methylmaleimide, ethylmaleimide, N-phenylmaleimide, O-chloro-N-phenylmaleimide and like malelmide compounds and the like. Said another copolymerizable vinyl monomer may be used solely or in combination of two or more.

(iv) Composition Ratio of Monomer Components (a-2)

Proportions of the aromatic vinyl monomer (monomer (i)), at least one monomer (monomer (ii)) selected from the group consisting of a vinyl cyanide monomer and an alkylester monomer of unsaturated carboxylic acid, and another copolymerizable vinyl monomer (monomer (iii)) to be comprised in the monomer components (a-2) are not limited, but the monomer components (a-2) may preferably comprise, when a total amount of monomers (i), (ii) and (iii) is 100 wt. %. 50–90 wt. % of the monomer (i), 50–10 wt. % of the monomer (ii) and 0–40 wt. % of the monomer (ii), more preferably 50–80 wt. % of the monomer (i), 50–20 wt. % of the monomer (ii) and 0–30 wt. % of the monomer (iii).

Preparation of Rubber-reinforced Aromatic Vinyl Resin (A)

Preparation process of the rubber-reinforced aromatic vinyl resin (A) is not limited, but preferable is a process wherein a graft copolymer is prepared by polymerizing the monomer components (a-2) in the presence of the rubber-like polymer (a-1). A known method such as emulsion polymerization, suspension polymerization, bulk polymerization and solution polymerization or a method combining them may be employed for the polymerization.

A graft ratio and a weight average particle diameter of the graft copolymer obtained by the above method are not limited, but the graft ratio may preferably be about 20–100% and the weight average particle diameter may preferably be about 0.05–5 μm.

The rubber-reinforced aromatic vinyl resin (A) used in the invention may be the graft copolymer or a mixture of the graft copolymer and the copolymer of the monomer components (a-2).

The rubber-reinforced aromatic vinyl resin (A) may preferably comprise 100–10 wt. % of the graft copolymer and 0–90 wt.% of the copolymer of the monomer components (a-2) when a total amount of the graft copolymer and the copolymer of the monomer components (a-2) is 100 wt. %. If the proportion of the graft copolymer is less than 10 wt. %, the resulting composition will undesirably be deteriorated in impact resistance.

In the preparation process of the graft copolymer, a copolymer of the monomer components (a-2) is produced as a by-product. The proportion of the graft copolymer mentioned above includes the amount of the by-product copolymer of the monomer components (a-2). In the present specification, "proportion of the copolymer of the monomer components (a-2)" means the proportion of the copolymer of the monomer components (a-2) prepared separately from the graft copolymer. A method for polymerizing the monomer components (a-2) is not limited, and a known method such as emulsion polymerization, suspension polymerization, bulk polymerization and solution polymerization or a method combining them may be employed for the polymerization.

Proportions of the rubber-like polymer (a-1) and the monomer components (a-2) to be used for the preparation of the rubber-reinforced aromatic vinyl resin (A) are not limited, but it is preferable to use, when a total amount of the rubber-like polymer (a-1) and the monomer components (a-2) is 100 wt. %, 5–80 wt. % of the rubber-like polymer (a-1) and 95–20 wt. % of the monomer components (a-2), in particular, 5–60 wt. % of the rubber-like polymer (a-1) and 95–40 wt. % of the monomer components (a-2). Here, in the case of employing only a graft polymer, the above proportions are those of the rubber-like polymer (a-1) and the monomer components (a-2) in the graft polymer and, in the case of employing a mixture of the graft polymer and the copolymer, the above proportions are those of the rubber-like polymer (a-1) and the monomer components (a-2) in the mixture.

(B) Polyamide Elastomer

The polyamide elastomer (B) is also known as a polyetherester amide, and is obtainable by reacting at least one component selected from the group consisting of aminocarboxylic acid having not less than 6 carbon atoms, lactam having not less than 6 carbon atoms and nylon mn salts (m+n≧12) as a hard segment (hereinafter sometimes referred to as "component (X)") with polyol as a soft segment (hereinafter sometimes referred to as "component (Y)").

Among the component (X), upper limit of the number of carbon atoms of the aminocarboxylic acid having not less than 6 carbon atoms may preferably be about 12; examples of such aminocarboxylic acid include ω-aminocaproic acid, ω-aminoenanthic acid, ω-aminocaprylic acid, ω-aminopelargonic acid, ω-aminocapric acid, 11-aminoundecanoic acid, 12-aminododecanoic acid and the like.

Upper limit of the number of carbon atoms of the lactam having not less than 6 carbon atoms may preferably be about 12; specific examples of such lactam include caprolactam, laurolactam and the like.

The nylon mn salts (m+n≧12) are the salts comprising equimolar amounts of dicarboxylic acid having not less than 6 carbon atoms, preferably 6–12 carbon atoms, and diamine having not less than 6 carbon atoms, preferably 6–12 carbon atoms; specific examples of such nylon mn salts include nylon 6.6 salt, nylon 6.10 salt, nylon 6.12 salt, nylon 11.6 salt, nylon 11.10 salt, nylon 11.12 salt, nylon 12.6 salt, nylon 12.10 salt, nylon 12.12 salt and the like.

Poly(alkyleneoxide)glycol may be used as the polyol which is the component (Y). Specific examples of the polyol include, polyethyleneglycol, poly(1,2 and 1,3 propyleneoxide)glycol, poly(tetramethyleneoxide)glycol, poly(hexamethyleneoxide)glycol, a block or random copolymer of ethyleneoxide and propyleneoxide, a block or random copolymer of ethyleneoxide and tetrahydrofuran, and the like. Average molecular weight of each of the polyol may suitably be about 500–3000.

Preparation process of the polyamide elastomer (B) is not limited, and a known process may be employed in the present invention. The polyamide elastomer (B) is obtainable by, for example, a process wherein a polyamide prepolymer is formed by reacting component (X) with dicarboxylic acid to prepare polyamide prepolymer, and then the polyamide prepolymer is polymerized with polyol, which is the component (Y), under a high temperature and a reduced pressure, a process wherein a carboxylic acid-terminated polyamide elastomer is produced by charging a reaction vessel with the component (X), component (Y) and dicarboxylic acid simultaneously, followed by reacting them at a high temperature and under an increased pressure and then the polyamide elastomer is polymerized under a normal pressure or a reduced pressure, or the like.

Dicarboxylic acid used in the preparation of the polyamide elastomer (B) may preferably have 4–20 carbon atoms; examples of which include terephthalic acid, isophthalic acid, phthalic acid, naphthalene-2,6-dicarboxylic acid, naphthalene-2,7-dicarboxylic acid, diphenyl-4,4-dicarboxylic acid, diphenoxyethanedicarboxylic acid, sodium 3-sulfoisophthalate and like aromatic dicarboxylic acids, 1,4-cyclohexanedicarboxilic acid, 1,2-cyclohexanedicarboxylic acid, dicyclohexyl-4,4-dicarboxylic acid and like alicyclic dicarboxylic acids, succinic acid, oxalic acid, adipic acid, dicarboxylic acid and the like.

Ratio of the component (X) and the component (Y) may be such that proportion of the component (X) based on a total amount of the component (X) and the component (Y) is about 95–10 wt. %, preferably about 90–20 wt. %. If the proportion of the component (X) is higher than 95 wt. %, the resulting resin composition will be deteriorated in flexibility. In turn, if the proportion is lower than 10 wt. %, the resulting resin composition is tend to be deteriorated in chemical resistance.

The polyamide elastomer to be used in the present invention may suitably have a weight average molecular weight of about 5,000–100,000.

Specific examples of the usable polyamide elastomer include those disclosed in Japanese Unexamined Patent Publications Nos. 232450/1987, 33456/1988, 95251/1988, 60647/1989, 240553/1989, 97751/1991, 309547/1992, 314741/1992, 348150/1992, 230365/1993, 262971/1993, 287161/1993, 295191/1993, 320497/1993, 313079/1994, 10989/1995, 145368/1995, 188475/1995, 188476/1995 and the like.

(C) Modified Vinyl Polymer

The modified vinyl polymer (C) to be used in the present invention comprises as a base skeleton a vinyl polymer obtainable by polymerizing at least one vinyl monomer, and contains in the vinyl polymer at least one functional group selected from the group consisting of carboxyl, epoxy, amino and amido. At least one of these functional groups must be present per molecule.

Specific examples of such modified vinyl polymer include (1) a polymer obtainable by polymerizing an ethylenically unsaturated monomer having a functional group(s), (2) a copolymer of an ethylenically unsaturated monomer having a functional group(s) and another ethylenically unsaturated monomer, (3) a polymer obtainable by polymerizing an ethylenically unsaturated monomer using an initiator having a functional group(s) and/or a chain transfer agent having a functional group(s) to introduce a functional group(s) to a molecular chain of the polymer.

Among the modified vinyl polymers to be used in the invention, specific examples of the ethylenically unsaturated monomer having a functional group(s) usable for the production of the polymer (1) or (2) are as follows.

Examples of the ethylenically unsaturated monomer having carboxyl include acrylic acid, methacrylic acid, maleic acid, maleic anhydride, itaconic acid and the like. Examples of the ethylenically unsaturated monomer having epoxy include glycidyl acrylate, glycidyl methacrylate, glycidyl itaconate and the like. Examples of the ethylenically unsaturated monomer having amino include aminoethyl acrylate, ethylaminopropyl methacrylate, phenylaminoethyl methacrylate and like aminoalkylester derivatives of (meth) acrylic acid, N-acetylvinylamine and like vinylamine derivatives, methallylamine and like allylamine derivatives, aminostyrene and the like. Examples of the ethylenically unsaturated monomer having amido include acrylamide, N-methylmethacrylamide and the like.

Examples of said another ethylenically unsaturated monomer usable for the production of the polymer (2) include styrene, α-methylstyrene. vinyltoluene and like aromatic vinyl monomers, acrylonitrile, methacrylonitrile and like vinyl cyanide monomers, methyl acrylate, methyl methacrylate, ethyl acrylate, ethyl methacrylate and like ester monomers of ethylenically unsaturated carboxylic acid, maleimide, N-phenylmaleimide, N-cyclohexylmaleimide and like maleimide monomers and the like.

Examples of the initiator having a functional group(s) usable for the production of the polymer (3) include those having carboxyl such as γ,γ'-azobis(γ-cyanovaleic acid) and succinic acid peroxide, those having amino such as α,α'-azobis(γ-amino-α,γ-divaleronitrile), p-aminobenzoylperoxide, and the like. Examples of the chain transfer agent having a functional group(s) include those having carboxyl such as mercaptopropionic acid, 4-mercaptobenzoic acid and thioglycolic acid and those having amino such as mercaptomethylamine, N-(β-mercaptoethyl)-N-methylamine, bis-(4-aminophenyl)disulfide, mercaptoaniline, and like chain transfer agents.

Polymerization method for preparing the modified vinyl polymer (C) is not limited, and may be any one of suspension polymerization, bulk polymerization, emulsion polymerization, solution polymerization and the like.

Known initiators and chain transfer agents may be used for the production of the polymer (1) or (2). Examples of the initiators include a peroxide such as potassium persulfate, hydrogen peroxide, benzoyl peroxide and lauroyl peroxide, an azo compound such as azobisisobutyronitrile, and oxidation-reduction initiators comprising an iron salt and an organic hydroperoxide such as cumenehydroperoxide. Examples of the chain transfer agent include n-dodecylmercaptan, t-dodecylmercaptan and like mercaptanes, α-methylstyrene dimer, terpinolene and the like.

In the production of the polymer (2), proportions of the ethylenically unsaturated monomer having a functional group(s) and said another ethylenically unsaturated monomer may differ depending on types of monomers to be used; however, there may preferably be used, based on a total amount thereof, about 0.01–99 wt. % of the ethylenically unsaturated monomer having a functional group(s) and about 1–99.99 wt. % of said another ethylenically unsaturated monomer, more preferably about 0.05–80 wt. % of the ethylenically unsaturated monomer having a functional group(s) and about 20–99.95 wt. % of said another ethylenically unsaturated monomer, particularly preferably about 0.15–50 wt. % of the ethylenically unsaturated monomer having a functional group(s) and about 50–99.9 wt. % of said another ethylenically unsaturated monomer.

Further, in the production of the polymer (3), amounts of the initiator having a functional group(s) and the chain transfer agent having a functional group(s) used for the polymerization of the ethylenically unsaturated monomer are not limited, but there may typically be used, based on 100 parts by weight of the ethylenically unsaturated monomer, about 0.01–5 parts by weight of the initiator and about 0.01–10 parts by weight of the chain transfer agent. The initiator and the chain transfer agent each having a functional group(s) may be used together, while they may be used in such a manner that one of them has a functional group(s) and the other does not. The ethylenically unsaturated monomer to be used in the production process of the polymer (3) does not necessarily have a functional group; however, it is of course possible to use an ethylenically unsaturated monomer having a functional group(s).

It is preferred to use the polymer (2) in the present invention from the viewpoints of easiness of adjusting a content of the functional group comprised in the polymer and balance of physical properties of the resulting composition.

(D) Alkali Metal Salt

Examples of the alkali metal salt (D) include lithium chloride, lithium bromide, lithium iodide, sodium iodide, sodium borohydride, lithium borofluoride, potassium borofluoride, lithium tetraphenylborate, potassium tetraphenylborate, sodium tetraphenylborate, lithium thiocyanate, sodium thiocyanate, potassium thiocyanate, lithium perchlorate, sodium perchlorate, potassium perchlorate and like alkali metal salts of inorganic acid; lithium trifluoroacetate, sodium trifluoroacetate, potassium trifluoroacetate, lithium trifluoromethanesulfonate, sodium trifluoromethanesulfonate, potassium trifluoromethanesulfonate, lithium acetate, sodium acetate, potassium acetate, lithium dodecylbenzenesulfonate, potassium dodecylbenzenesulfonate, sodium dodecylbenzenesulfonate, lithium dodecylsulfonate, potassium dodecylsulfonate, sodium dodecylsulfonate and like alkali metal salts of organic acid and the like. These metal salts may be used solely or in combination of two or more.

Among these alkali metal salts, potassium thiocyanate and an alkali metal salt of a nuclear substitution product of benzenesulfonic acid such as dodecylbenzenesulfonic acid may preferably be used in the present invention.

Resin Composition of the Present Invention and Resin Article Formed Therefrom

The resin composition of the invention comprises the rubber-reinforced aromatic vinyl resin (A), the polyamide elastomer (B), the modified vinyl polymer (C) having at least one functional group selected from the group consisting of carboxyl, epoxy, amino and amido and the alkali metal salt (D).

Form of the resin composition of the invention is not limited insofar as the resin composition comprises the above four components. For example, each of the components may be mixed in the form of a powder or the like, but they may typically be mixed and melted to give a resin composition in the form of pellets so as to be used for the production of resin articles.

Method of mixing the components and order of the components to be added are not limited, and the components may be mixed simultaneously or by a multistage mixing comprising plural steps such as a step of mixing two or three components and a step of mixing the rest of the components. A known mixing apparatus such as a kneader, Banbury mixer, roll or the like may be used for mixing the components. After the mixing process, the mixture is pelletized by an ordinary pelletizer or the like to give a composition in the form of pellets.

Proportions of the components to be comprised in the resin composition of the present invention is not crucial, but the resin composition may preferably comprise about 2–96.95 wt. % of the rubber-reinforced aromatic vinyl resin (A), about 2–96.95 wt. % of the polyamide elastomer (B), about 1–50 wt. % of the modified vinyl polymer (C) and about 0.05–10 wt. % of the alkali metal salt (D) when a total amount of the four components (A)–(D) is 100 wt. %. The resin composition obtained by mixing the components (A)–(D) in the above ratio is good in fluidity and so on and excellent in moldability. Further, it is possible to form a satisfactory electrostatic coating on a article formed from the resin composition without applying a conductive primer.

Moreover, the article is excellent in various physical properties such as impact resistance, mechanical strength and the like and good in dimensional stability, appearance and so on.

In the case where the proportion of the rubber-reinforced aromatic vinyl resin (A) is too low, the resulting composition will be deteriorated in fluidity, and an article formed therefrom will be insufficient in impact resistance and mechanical strength and further be deteriorated in appearance and dimensional stability. In turn, if the proportion is too high, deposition efficiency of coating composition cannot be improved.

In the case where the proportion of the polyamide elastomer (B) is too low, deposition efficiency of coating composition cannot be improved. In turn, if the proportion is too high, the article formed from the resulting composition will be deteriorated in rigidity.

In the case where the proportion of the modified vinyl polymer (C) is too low, the article formed from the resulting composition will be deteriorated in water resistance and adhesion of coating. In turn, if the proportion is too high, the resulting composition will be deteriorated in fluidity, and an article formed therefrom will be deteriorated in mechanical resistance and appearance.

In the case where the proportion of the alkali metal salt (D) is too low, deposition efficiency of coating composition cannot be improved. In turn, if the proportion is too high, an article formed from the resulting composition will be deteriorated in thermostability and appearance.

More preferably, the resin composition of the present invention may comprise about 50–90 wt. % of the rubber-reinforced aromatic vinyl resin (A), about 5–50 wt. % of the polyamide elastomer (B), about 3–20 wt. % of the modified vinyl polymer (C) and about 0.2–5 wt. % of the alkali metal salt (D), based on 100 wt. % of a total amount of the four components (A)–(D), from the viewpoints of being good not only in deposition efficiency of coating composition but also in mechanical properties such as rigidity.

To the resin composition of the present invention, it is possible to add, when so required, an antioxidant (for example, 2,6-di-t-butyl-4-methylphenol, 2-(1-methylcyclohexyl)-4,6-dimethylphenol, 2,2-methylene-bis-(4-ethyl-6-t-methylphenol), 4-4'-thiobis-(6-t-butyl-3-methylphenol), dilaurylthiodipropionate, tris(di-nonylphenyl)phosphite, wax), an ultraviolet absorbent (for example, p-t-butylphenyl salicylate, 2,2'-dihydroxy-4-methoxybenzophenone, 2-(2'-hydroxy-4'-n-octoxyphenyl) benzotriazole), a lubricant (for example, paraffine wax, stearic acid, hardened oil, stearoamide, methylenebisstearoamide, ethylenbisstearoamide, n-butyl stearate, ketone wax, octyl alcohol, lauryl alcohol, hydroxystearic acid triglyceride), a flame retarder (for example, antimonous oxide, aluminium hydroxide, zinc borate, tricresyl phosphate, tris(dichloropropyl)phosphate, chlorinated paraffine, tetrabromobutane, hexabromobenzene, tetrabromobisphenol A), a colorant (for example, titanium oxide, carbon black), a filler (for example, calcium carbonate, clay, silica, glass fiber, glass beads, carbon fiber), a pigment and the like.

Amounts of these additives are not limited, and may suitably be adjusted depending on the purposes of using them. A total amount of the additives to be used may typically be about 0.01–100 parts by weight, preferably about 0.01–50 parts by weight, based on 100 parts by weight of a total amount of the components (A)–(D).

Further, when so required, another thermoplastic resin such as polycarbonate, polyvinyl chloride, polyamide, polybutylene terephthalate, polyethylene terephthalate, polyphenylene oxide and polyoxymethylene may be mixed with the resin composition of the present invention.

Amounts of the thermoplastic resins are not limited, and they may suitably be adjusted depending on the purposes of using them. A total amount of the thermoplastic resins to be used may typically be about 1–100 parts by weight, preferably 1–50 parts by weight, based on 100 parts by weight of a total amount of the components (A)–(D).

When forming the resin composition of the present invention into a desired shape, a forming method may be selected from conventional methods depending on the type of the target article. For example, the resin composition in the form of pellets as mentioned above may suitably be formed by a known forming method such as injection molding, extrusion forming, compression molding, blow molding and the like at a melted resin temperature of about 200–280° C. and at a mold temperature of about 30–100° C.

The article formed from the resin composition of the present invention is good in electrostatic coatability and, therefore, it is possible to form an electrostatic coating on the article by an ordinary method without conductive primer treatment. The coating thus formed is uniform in its coating surface quality even when the article had a complicated shape and is good in adhesion.

EFFECT OF THE INVENTION

The resin composition of the present invention is good in fluidity and moldability, and it is possible to form a satisfactory electrostatic coating on the article formed from the resin composition without a conductive primer. The article is excellent in various physical properties such as impact resistance and mechanical strength, and good in dimensional stability, appearances and the like.

The resin article has various applications such as vehicle parts, electric appliances, business equipment, etc. and, in particular, is suitably used for the vehicle parts.

BEST MODE FOR CARRYING OUT THE INVENTION

The present invention will be illustrated in the following based on examples, but the invention is not limited to the examples. In addition, "parts" and "%" in the composition ratios are based on weights unless otherwise stated.

EXAMPLES 1–3 AND COMPARATIVE EXAMPLES 1–5

Components used in the examples and comparative examples are as follows.

Rubber-reinforced Aromatic Vinyl Resin (A)

A-1: 20 parts (solid content) of polybutadiene latex (average particle diameter: 0.35 $\mu$m; gel content: 80%), 55 parts of styrene and 25 parts of acrylonitrile are polymerized by a known emulsion polymerization method. Obtained polymer latex was subjected to a salting-out treatment, dehydration and drying to give A-1.

Polyamide Elastomer (B)

B-1: polyetherester amide ("PELESTAT IOS-6321", a product of Sanyo Chemical Industries, Ltd.).

B-2: polyetherester amide ("PEBAX 4011MA", a product of Toray Industries, Inc.).

Modified Vinyl Polymer (C)

C-1: 70 parts of styrene, 27 parts of acrylonitrile and 3 parts of acrylic acid are polymerized by a known emulsion polymerization method. Obtained polymer latex was subjected to a salting-out treatment, dehydration and drying to give C-1.

Alkali Metal Salt (D)

D-1: sodium dodecylbenzenesulfonate.

Above components were mixed in the proportions shown in Table 1. Compositions thus obtained were melted and kneaded by a uniaxial extruder at a temperature of 220° C. to give pellets. As to the pellets, physical properties were measured according to the following methods. The measurement methods are described below. Results of the measurements are shown in Table 1.

Impact Resistance (Notched Izot)

By a method according to ASTM D-256, a test piece having a thickness of ¼ inch was prepared from each of the compositions at a temperature of 230° C., and a notched Izot impact value of the test piece was measured at a temperature of 23° C.

Fluidity

By a method according to ASTM D-1238, the fluidity was measured under the conditions of a melting temperature of 240° C. and with a load of 10 kg.

Rigidity

By a method according to ASTM D-790, a test piece having a thickness of ¼ inch was prepared from each of the compositions at a temperature of 230° C. and a flexural modulus of the test piece was measured at a temperature of 23° C.

Molding Shrinkage

An article was molded from each of the compositions by infection molding at a temperature of 230° C. using a mold having an impression of 150 mm×90 mm×3 mm. After allowing the article to stand for 72 hours at a room temperature, size thereof was measured with the accuracy of second decimal places (in millimeters) by using calipers, and the molding shrinkage was calculated from the following expression:

Molding shrinkage (%)=(mold dimension−size of article)×100/ mold dimension.

Surface Resistivity

An article was molded from each of the compositions by injection molding at a temperature of 230° C. using a mold having an impression of 150 mm×90 mm×3 mm. After conditioning the test piece under the conditions of a temperature of 23° C. and a relative humidity of 55% for 24 hours, the surface resistivity of the test piece was measured by using a surface resistivity meter "SM-10E" (product of Toa Electronics Ltd.), under the conditions of a measuring voltage of 500 V and a sampling time of 10 seconds.

Appearance of Article

An article was molded from each of the compositions by injection molding at a temperature of 230° C. using a mold having an impression of 95 mm×55 mm×3 mm. The article was visually observed of its evenness of luster for evaluation of its appearance, and the evaluation is shown based on the following criteria:

A: good; to C: bad.

Weight and Adhesion of Coating

An article was molded from each of the compositions by injection molding at a temperature of 230° C. using a mold having an impression of 240 mm×250 mm×3.5 mm. Electrostatic coating was applied on the article under the following conditions.

Coating device:

Reciprocating rotary electrostatic coating device (IVW bell-shaped coating device, product of Honda Engineering Co., Ltd.);

Bell diameter: 70φ;

Applied voltage: −60 Kv;

Discharge rate: 100 g/min;

Distance between gun and molded article: 200 mm;

Revolution: 10000 rpm;

Shaving air: 0.4 kg:

CV speed: 5400 mm/min;

Reciprocating speeds: 2600 mm/min.

Coating material:

Two-pack type curable urethane coating composition (HIGH URETHANE #5000 and #6500, products of NOF Corporation).

Coating conditions:

Temperature of 27° C.; humidity of 65% RH.

After performing the electrostatic coating under the above conditions, the coated article was allowed to stand for 2 hours at a temperature of 80° C. to be dried. Then, a weight of coating formed on the article was measured.

Further, adhesion of the coating formed on the article was measured by the following method.

First, the coating film was cross-cut to reach the body of the article in order to form 100 cells (10×10) of 1 mm square using a middling razor, the cutting edge thereof being retained at an angle of about 30 degree with respect to the coating film. Then, a cellophane adhesive tape having a width of 24 mm was brought into close contact with the cross-cut portion, and the tape was instantly peeled off while one end thereof was retained at right angle with respect to the surface of the article, to thereby examine the adhesion of coating. Results are expressed by number of cells peeled off/number of tested cells (100).

Adhesion of the coating was measured under the following conditions.

Condition 1: Adhesion was measured after allowing a coated article to stand for 120 hours at a humidity of 95% and a temperature of 50° C.

Condition 2: Adhesion was measured after allowing a coated article to stand for 240 hours at a humidity of 95% and a temperature of 50° C.

|  | Example | | | Comparative Example | | | | |
| --- | --- | --- | --- | --- | --- | --- | --- | --- |
|  | 1 | 2 | 3 | 1 | 2 | 3 | 4 | 5 |
| Proportions (parts) | | | | | | | | |
| A-1 | 70 | 50 | 85 | 100 | 80 | 40 | 70 | 25 |
| B-1 | 18 | 18 | 8 | — | 20 | 58 | 20 | 18 |
| B-2 | — | 15 | — | — | — | — | — | — |

-continued

|  | Example | | | Comparative Example | | | | |
|---|---|---|---|---|---|---|---|---|
|  | 1 | 2 | 3 | 1 | 2 | 3 | 4 | 5 |
| C-1 | 10 | 15 | 5 | — | — | — | 10 | 55 |
| D-1 | 2 | 2 | 2 | — | — | 2 | — | 2 |
| Physical Properties | | | | | | | | |
| Impact Resistance (kg · cm/cm) | 28 | 32 | 22 | 20 | 23 | 42 | 27 | 12 |
| Fluidity (g/10 min) | 36 | 61 | 28 | 25 | 43 | 68 | 35 | 17 |
| Rigidity (kg/cm$^2$) | $1.8 \times 10^4$ | $1.4 \times 10^4$ | $1.8 \times 10^4$ | $2.4 \times 10^4$ | $1.7 \times 10^4$ | $0.9 \times 10^4$ | $1.8 \times 10^4$ | $2.1 \times 10^4$ |
| Molding Shrinkage (%) | 0.6 | 0.9 | 0.6 | 0.5 | 0.6 | 1.1 | 0.7 | 0.6 |
| Surface Resistivity ($\Omega$) | $2.0 \times 10^9$ | $7.0 \times 10^8$ | $1.0 \times 10^{10}$ | $>10^{16}$ | $3.0 \times 10^{12}$ | $7.0 \times 10^7$ | $3.5 \times 10^{11}$ | $5.2 \times 10^9$ |
| Appearance | A | A | A | A | A | A | A | C |
| Weight of Coating (g) | 1.02 | 1.09 | 0.85 | 0.17 | 0.55 | 1.12 | 0.52 | 0.82 |
| Adhesion: Condition 1 | 100/100 | 100/100 | 100/100 | 100/100 | 3/100 | 100/100 | 100/100 | 100/100 |
| Condition 2 | 100/100 | 100/100 | 100/100 | 100/100 | 0/100 | 100/100 | 100/100 | 100/100 |

What is claimed is:

1. A formed resin article having an electrostatic coating film, which is produced by electrostatically coating a resin article which is formed from a resin composition wherein the resin composition comprises 50–90 wt. % of a rubber-reinforced aromatic vinyl resin (A), 5–50 wt. % of a polyamide elastomer (B), 3–20 wt. % of a modified vinyl polymer (C) containing at least one functional group selected from the group consisting of carboxyl, epoxy, amino and amido, and 2–5 wt. % of an alkali metal salt of dodecylbenzenesulfonic acid (D), based on 100 wt. % of a total amount of four components (A)–(D).

2. A formed resin article according to claim 1, wherein the rubber-reinforced aromatic vinyl resin (A) is a graft copolymer obtainable by polymerizing monomer components (a-2) in the presence of a rubber polymer (a-1), or a mixture of said graft copolymer and a copolymer of the monomer components (a-2), the monomer components (a-2) comprising (i) an aromatic vinyl monomer, (ii) at least one monomer selected from the group consisting of a vinyl cyanide monomer and an alkylester monomer of unsaturated carboxylic acid and, optionally, (iii) another copolymerizable vinyl monomer.

3. A formed resin article according to claim 1, wherein the polyamide elastomer (B) is obtained by reacting polyol with at least one compound selected from the group consisting of aminocarboxylic acid having not less than 6 atoms, lactam having not less than 6 carbon atoms and nylon mn salt wherein m+n≧12.

4. A formed resin article according to claim 1, wherein the modified vinyl polymer (C) is a copolymer of an ethylenically unsaturated monomer containing at least one functional group selected from the group consisting of carboxyl, epoxy, amino and amido with another ethylenically unsaturated monomer.

* * * * *